United States Patent
Haghighi

(10) Patent No.: US 6,178,265 B1
(45) Date of Patent: *Jan. 23, 2001

(54) METHOD AND APPARATUS FOR MOTION VECTOR COMPRESSION

(75) Inventor: Siamack Haghighi, Tempe, AZ (US)

(73) Assignee: Intel Corporation, Santa Clara, CA (US)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/738,175

(22) Filed: Oct. 28, 1996

Related U.S. Application Data

(63) Continuation of application No. 08/310,650, filed on Sep. 22, 1994, now abandoned.

(51) Int. Cl.[7] .................................................. G06K 9/46
(52) U.S. Cl. ........................ 382/236; 348/416; 348/699
(58) Field of Search .................................... 382/100, 107, 382/232, 236, 225, 168; 348/402, 416, 699, 700, 701

(56) References Cited

U.S. PATENT DOCUMENTS

| | | | |
|---|---|---|---|
| 4,575,756 | * | 3/1986 | Furukawa .................. 348/416 |
| 4,731,651 | * | 3/1988 | Matsumoto et al. ........ 348/416 |
| 4,777,530 | * | 10/1988 | Kondo ....................... 348/416 |
| 4,862,260 | * | 8/1989 | Harradine et al. .......... 348/416 |
| 4,864,394 | * | 9/1989 | Gillard ....................... 348/416 |
| 5,193,001 | * | 3/1993 | Kerdranvrat ................ 348/701 |
| 5,351,095 | * | 9/1994 | Kerdranvat ................ 348/699 |
| 5,398,068 | * | 3/1995 | Liu et al. ................... 348/416 |
| 6,005,639 | * | 12/1999 | Thomas et al. ............. 348/699 |

OTHER PUBLICATIONS

Gonzalez et al. *Digital Image Processing,* Addison–Wesley, pp. 579–583, Mar. 1992.*

* cited by examiner

*Primary Examiner*—Jon Chang
(74) *Attorney, Agent, or Firm*—Blakely, Sokoloff, Taylor & Zafman LLP

(57) ABSTRACT

A method and apparatus for motion vector compression is described. Compression is performed in the context of a two-dimensional processing system in which two-dimensional frames are each encoded into minimum-error motion vectors. For each frame, the minimum-error motion vectors are compressed by histogramming at least one minimum-error motion vector to generate at least one histogram peak. N most dominant peaks represent the frequency of occurrence of N most dominant motion vectors. Compression further requires that each minimum-error motion vector is mapped to one of the N most dominant motion vectors. Before undergoing histogramming, each minimum-error motion vector may be mapped to a null motion vector (0, 0) if the minimum-error motion vector does not provide a significant improvement over the frame-to-frame correlation error associated with the null motion vector for the frame. In one embodiment, the mapping of the minimum-error motion vectors to the N most dominant motion vectors may be carried out by mapping a minimum-error motion vector to a corresponding dominant motion vector, where the frame-to-frame correlation error associated with the corresponding dominant motion vector is less than the frame-to-frame correlation error associated with all other dominant motion vectors associated with the minimum-error motion vector.

28 Claims, 6 Drawing Sheets

METHOD AND APPARATUS FOR MOTION VECTOR COMPRESSION

This is a Continuation Application of application Ser. No. 08/310,650, filed Sep. 22, 1994, now abandoned.

BACKGROUND OF THE INVENTION

1. Field of the Invention

The present invention relates to the field of video compression, and in particular to motion vector estimation.

2. Description of the Related Art

In video processing, video image compression is often necessary to overcome the bandwidth constraints of the transmission medium interposed between the video transmitter and the video receiver. For example, a typical video source might transmit a 320×240 pixel image at a rate of approximately 30 frames per second, using 12 bits per pixel. Based on these figures, it can be appreciated that a video signal requires a transmission rate on the order of tens or hundreds of megabits per second. In contrast, a medium such as a conventional analog telephone line only has a channel capacity of approximately 28.8 kilobits per second.

Generally, two techniques are used for video compression—intraframe compression and interframe compression. Intraframe compression takes advantage of the redundancy of the information within one frame. Interframe compression encodes the relative positions between frames. Examples of intraframe compression include run-length encoding, Fast Fourier Transform, Discrete Cosine Transform, Discrete Walsh Transform and fractal compression.

Interframe compression takes advantage of the correlation between frames, and is most advantageous when there is little frame-to-frame movement of the image. Interframe compression is especially useful in an application such as video conferencing, where motion tends to be slow and may only involve the movement of the mouth and neck of the person speaking, for example. One of the most common interframe compression techniques is motion estimation. This method assumes that a frame denoted the reference frame (F1) is followed in time by a subsequent frame denoted the search frame (F2). The search frame F2 is subdivided into blocks. The reference frame F1 is subdivided into search areas. Each F1 search area corresponds to an F2 block. Search areas may overlap. According to convention, the absolute coordinates of the reference and search frames have their (0, 0) reference point at the upper left corner of the frame.

The motion estimation model assumes that the image in F2 is a translation of the image in F1, and that the image content does not change or that such a change is compensated for by a well-known technique known as "residual compensation." Because F2 is a translation of F1, an F2 block must be located somewhere within a search area in F1. Given some a priori knowledge of the image velocity, the encoder designer would select an appropriate size for the search area. For example, a slow-moving image would require a search area smaller in size than a fast-moving image because the frame-to-frame image motion would cover a shorter distance.

The motion estimation technique results in the generation of a motion estimation vector. Each motion vector is associated with an F2 block. The motion vector represents the relative coordinates in the F1 search area at which a particular F2 block may be found. The motion vector specifies the relative translation that must be performed from the F2 block coordinates to find the F1 block that contains the corresponding F2 image. For example, if the motion vector for the F2 block located at F2 coordinates (7, 20) is (3 −4), then the corresponding image in the F1 search area that corresponds to the F2 block is found by moving three pixels to the right and four pixels up (the negative direction is up in standard video notation) in the F1 frame. Accordingly, the corresponding F1 frame is located at (10, 16).

As is known in the art, the motion vector for each F2 block is calculated by correlating the F2 block with the block's corresponding F1 search area. For example, the F2 block may be scanned over the search area pixel-by-pixel. In that case, the F2 block is overlaid at an initial position within the F1 search area. An F1–F2 correlation error between the pixel intensity values of the F2 block and the overlaid F1 search area is then calculated. The error measure may be the mean absolute error or the mean square error, for example. A wide variety of other error measures may, of course, be employed. The F2 search block may then be moved one pixel horizontally or vertically within the F1 search area. The error at that position is then calculated. This process continues until the error between the F2 block and the F1 search area has been calculated for every position within the search area. The minimum error over all positions represents the highest correlation between the F2 block and the F1 search area. The (x, y) translation of the F1 position associated with the minimum error is selected as the motion vector v for the corresponding F2 search block. The term "motion vector" may generally refer to any (x, y) translation vector within the search area. However, the motion vector v will be interchangeably referred to as the "minimum-error motion vector," or just the "motion vector." The meaning of the term "motion vector" will be clear from the context herein.

The procedure to generate the minimum-error motion vector is repeated for the next F2 block until motion vectors for each F2 block have been calculated. One common motion estimation scheme that follows this procedure is the ISO/IEC 11172-2 MPEG (Motion Picture Express Group) standard. Those skilled in the art will recognize that, after reading this disclosure, the present invention applies not only to motion vectors formed according to the pixel-by-pixel scan described above, but may be extended to motion vectors generated by any scheme.

The motion vectors are used as follows. The encoder at the transmitter first transmits the reference frame F1. This of course consumes a large amount of time and bandwidth. However, subsequent images may be represented by motion vectors. The motion vectors for the next frame, F2, are then transmitted. Motion vectors for subsequent frames with respect to F1 may then be transmitted over the transmission medium. At some point, however, the source image may change entirely or undergo a large movement outside the search area boundaries, which would require the entire image to be transmitted. After that point, subsequent images may be represented by motion vectors as before.

Unfortunately, even after undergoing compression through motion vector estimation, the encoded image bandwidth may still exceed channel capacity. For example, a 14.4 kilobit per second telephone modem typically may have only 9600 bits per second available for video information. Ten frames are transmitted each second, leaving 960 bits per second to transfer the motion vectors for an entire frame. A typical search area runs ±8 pixels in both the x and y directions, which is the equivalent of 16 pixel positions in both directions. Transmission of this information requires eight bits. Each motion vector must represent the translation of the F2 block within the search area. Thus, eight bits per motion vector are required. A typical frame size is on the order of 320×240 pixels, which can be divided into 1200 8×8 blocks (a typical size). Thus, the number of bits to transmit one motion vector-encoded frame is 1200 motion vectors per frame×8 bits per motion vector=9600 bits per frame. Comparing this number to the 960 bits available to transfer the motion vectors for a frame reveals that further compression is required.

It can thus be appreciated that a need exists for a secondary compression technique to compress motion vector information to an acceptable bandwidth.

SUMMARY OF THE INVENTION

The present invention provides a method and apparatus for motion vector compression. Compression according to the present invention is performed in the context of a two-dimensional processing system in which two-dimensional frames are each encoded into minimum-error motion vectors. Each frame is divided into blocks, and a motion vector represents a frame-to-frame translation of a block. Each motion vector is associated with a frame-to-frame correlation error, and has a frequency of occurrence within a frame. Each minimum-error motion vector is a motion vector associated with a minimum frame-to-frame correlation error for a block. For each frame, the minimum-error motion vectors are compressed by histogramming the minimum-error motion vectors to generate histogram peaks. Each peak represents the frequency of occurrence of a minimum-error motion vector within the frame. N most dominant peaks represent the frequency of occurrence of N most dominant motion vectors. Compression further requires that each minimum-error motion vector be mapped to one of the N most dominant motion vectors.

Before undergoing histogramming, these minimum-error motion vectors may be thresholded by mapping a minimum-error motion vector to a null motion vector (0, 0) if the minimum-error motion vector does not provide a significant improvement over the frame-to-frame correlation error associated with the null motion vector for the frame.

The mapping of the minimum-error motion vectors to the N most dominant motion vectors may be carried out by dividing the minimum-error motion vectors into neighborhoods around the N most dominant motion vectors, and mapping a minimum-error motion vector to the dominant motion vector within the neighborhood associated with the minimum-error motion vector. In addition, the neighborhoods may include a neighborhood around the null motion vector, and a minimum-error motion vector may be mapped to the null motion vector if the null motion vector is within the neighborhood associated with the minimum-error motion vector.

In another embodiment, the mapping of the minimum-error motion vectors to the N most dominant motion vectors may be carried out by mapping a minimum-error motion vector to a corresponding dominant motion vector, where the frame-to-frame correlation error associated with the corresponding dominant motion vector is less than the frame-to-frame correlation error associated with all other dominant motion vectors for the block associated with the minimum-error motion vector.

BRIEF DESCRIPTION OF THE DRAWINGS

The objects, features and advantages of the present invention will be apparent to one skilled in the art in light of the following detailed description in which.

DETAILED DESCRIPTION OF THE INVENTION

The present invention provides a method and apparatus for motion vector compression. For purposes of explanation, specific details are set forth to provide a thorough understanding of the present invention. However, it will be understood by those skilled in the art, from reading this disclosure, that the invention may be practiced without these details. Moreover, well-known elements, devices, process steps and the like are not set forth in order to avoid obscuring the invention.

Figure 1:
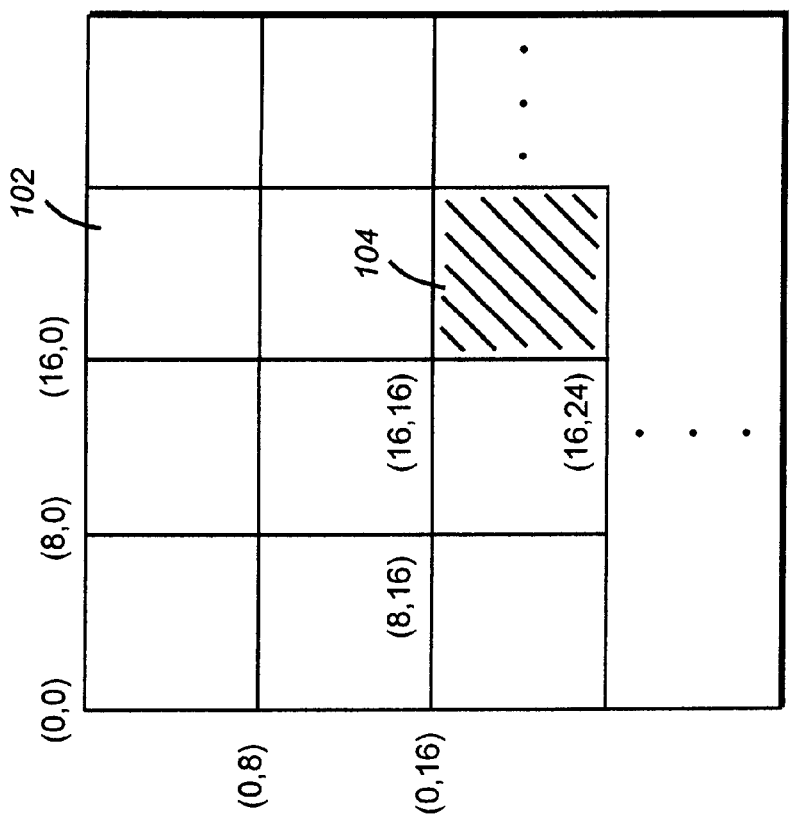
FIG. 1 illustrates a reference frame F1 and a subsequent search frame F2.
Figure 1:
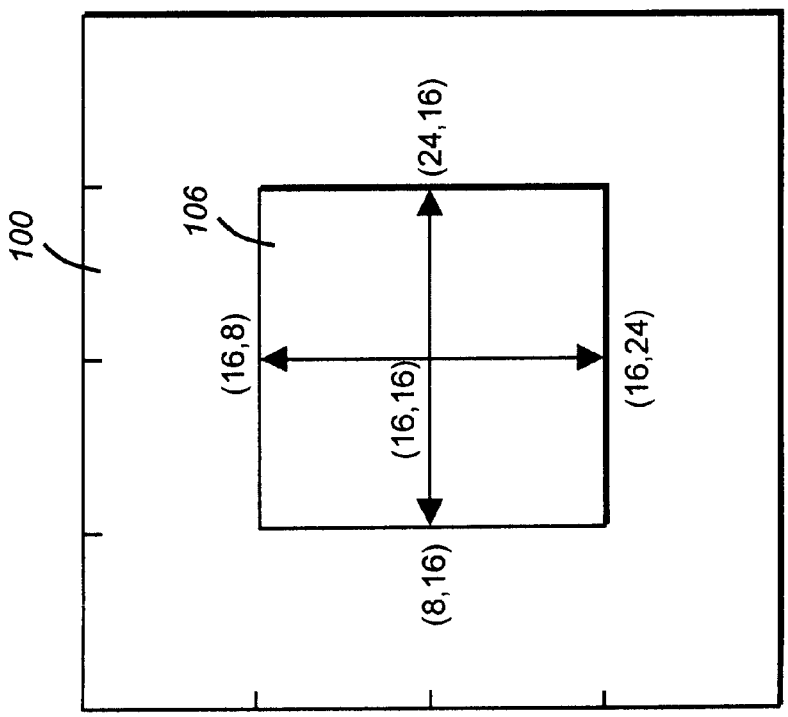

FIG. 1 illustrates a reference frame F1 100 and a search frame F2 102 according to a conventional motion estimation scheme. The search frame F2 follows the reference frame F1 in time. The search frame F2 is divided into search blocks such as search block 104. In this example, each reference block is 8×8 pixels in size.

As described previously, each search block is scanned over a corresponding search area within the reference frame F1 100. For example, search block 104 is scanned over a search area 106 within frame F1 100. In this example, the search range is ±8 pixels in both the horizontal and vertical directions. The x and y translations that correspond to the minimum F1–F2 correlation error measured within the search area are selected as the minimum-error motion vector for the search block 104. This process is repeated for each search block within the search frame F2 102. Those skilled in the art will recognize that the present invention is applicable to any size F2 search block and F1 search area. Those skilled in the art will also recognize that the search blocks need not be uniformly the same size and that the size of the corresponding search areas may vary as well.

Figure 2:
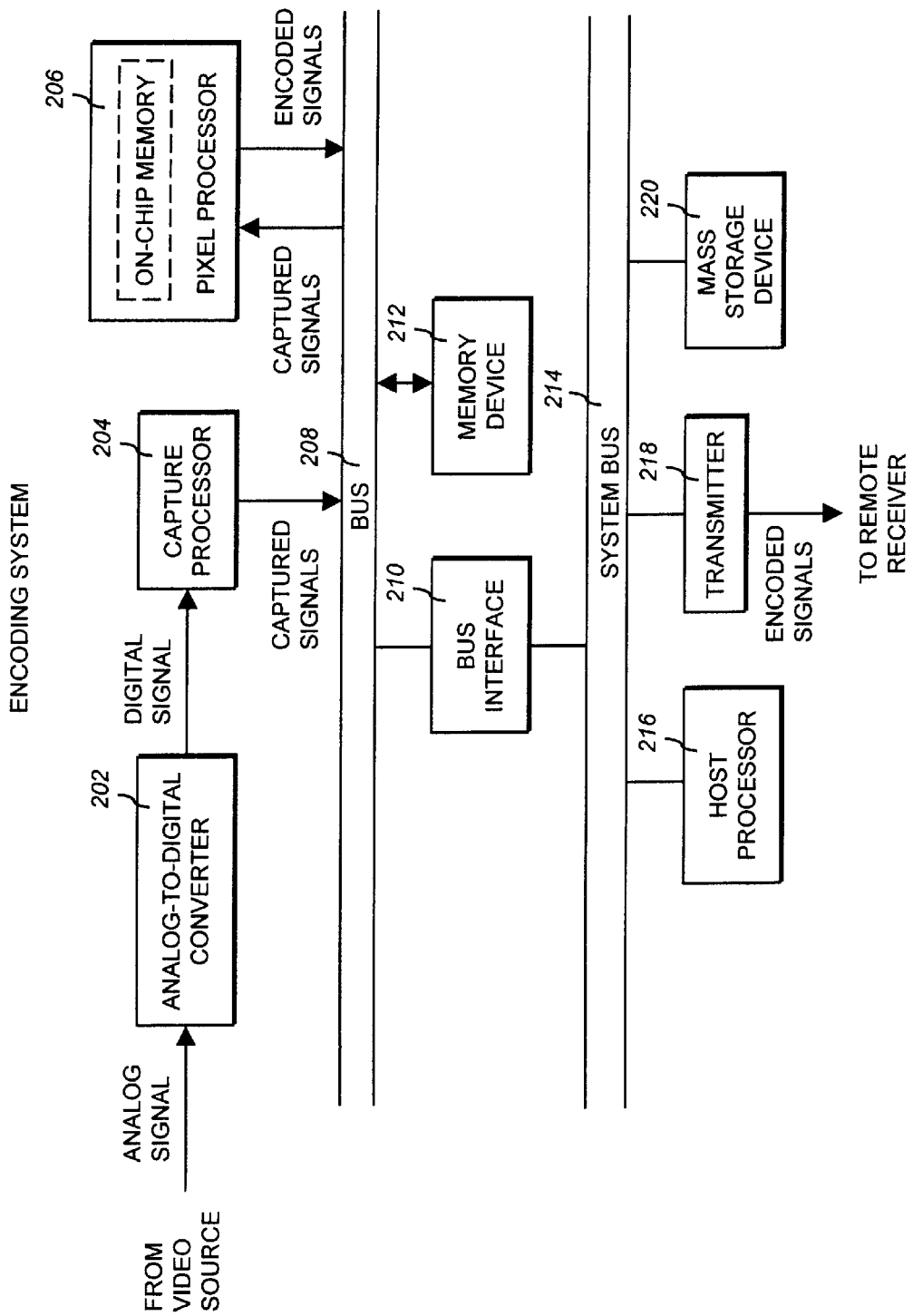
FIG. 2 illustrates a video processing system for implementing motion estimation according to an embodiment of the present invention.

FIG. 2 illustrates a video processing system for implementing motion estimation processing according to an embodiment of the present invention. An analog-to-digital (A/D) converter 202 receives analog video signals from a video source. The video source may be any suitable source of analog video signals such as a video camera or a VCR for generating local analog video signals or a video cable or receiver for receiving remote video signals. The A/D converter 202 includes circuitry for digitizing the analog video signals into digital video component signals, e.g., Y, U and V signals. A capture processor 204 receives, captures and stores the digitized component signals as sub-sampled video frames in a memory device 212 over a local bus 208. Each sub-sampled video frame is represented by pixel bitmaps, one for each component of the digitized video signals. In a preferred embodiment, the capture processor 204 captures video signals in a YUV9 (or YUV12) format, in which every 4×4 block of pixels of the Y component plane corresponds to a single pixel (or two pixels for YUV12) in the U component plane and a single pixel (or two pixels) in the V component plane. A pixel processor 206 or a host processor 216 accesses the captured bitmaps from the memory device 212 over the bus 208 or from a mass storage device 220 over a bus 214 through a bus interface 210. The processor 206 or 216 generates motion-vector-encoded video signals that represent the captured video signals. The pixel processor 206 or host processor 216 compresses the video signals according to the techniques of the present invention. The encoded video signals may be stored to off-chip memory device 212 over the bus 208 for eventual transmission to the host processor 216 over the bus 208, the bus interface 210 and the system bus 214. The host processor 216 may transmit the encoded video signals to a transmitter 218 for real-time transmission to a remote receiver (not shown), store the encoded video signals in the mass storage device 220 for future processing, or both. The receiver includes decoding circuitry for decoding encoded signals received from the video processing system.

The video processing system is preferably a general microprocessor-based computer system incorporating a special purpose video-processing plug-in board. In particular, the pixel processor 206 may be any suitable processor with on-chip memory for encoding sub-sampled video signals, such as an Intel® i750® pixel processor, wherein the pixel processor 206 is programmed to implement the encryption techniques of the present invention. The memory device 212 may be any suitable computer memory device, such as a video random access memory (VRAM) or dynamic RAM (DRAM) device. The logical bus 208 may be any suitable digital signal transfer device and is preferably an Industry Standard Architecture (ISA) bus, an Extended ISA (EISA) bus, a PCI bus or a VL bus. The bus interface 210 may be any suitable device for interfacing between the bus 208 and the systems bus 214. In a preferred embodiment, the A/D converter 202, the capture processor 204, the pixel processor 206, the bus 208, the bus interface 210, and the memory device 212 are contained in a single-plug-in board, such as an Intel® ActionMedia®-II board, capable of being added to a general microprocessor-based personal computer system.

The host processor 216 may be any suitable processor for controlling the operations of the special-purpose video processing board and is preferably an Intel® general purpose microprocessor such as an Intel® i386™, i486™, or Pentium™ processor. The system bus 214 may be any suitable digital signal transfer device and is preferably an ISA bus, an EISA bus, a PCI bus or a VL bus. The transmitter 218 may be any suitable device for transmitting digital signals to a remote receiver. Those skilled in the art will understand that the encoded video signals may be transmitted using any suitable means of transmission such as telephone line, RF antenna, local area network, or remote area network. In an alternative embodiment, the transmitter 218 may be connected directly to bus 208 rather than to system bus 214. Those skilled in the art will recognize that the present invention is not limited to the video processing system described above, but is applicable to any video processing system.

Figure 3:
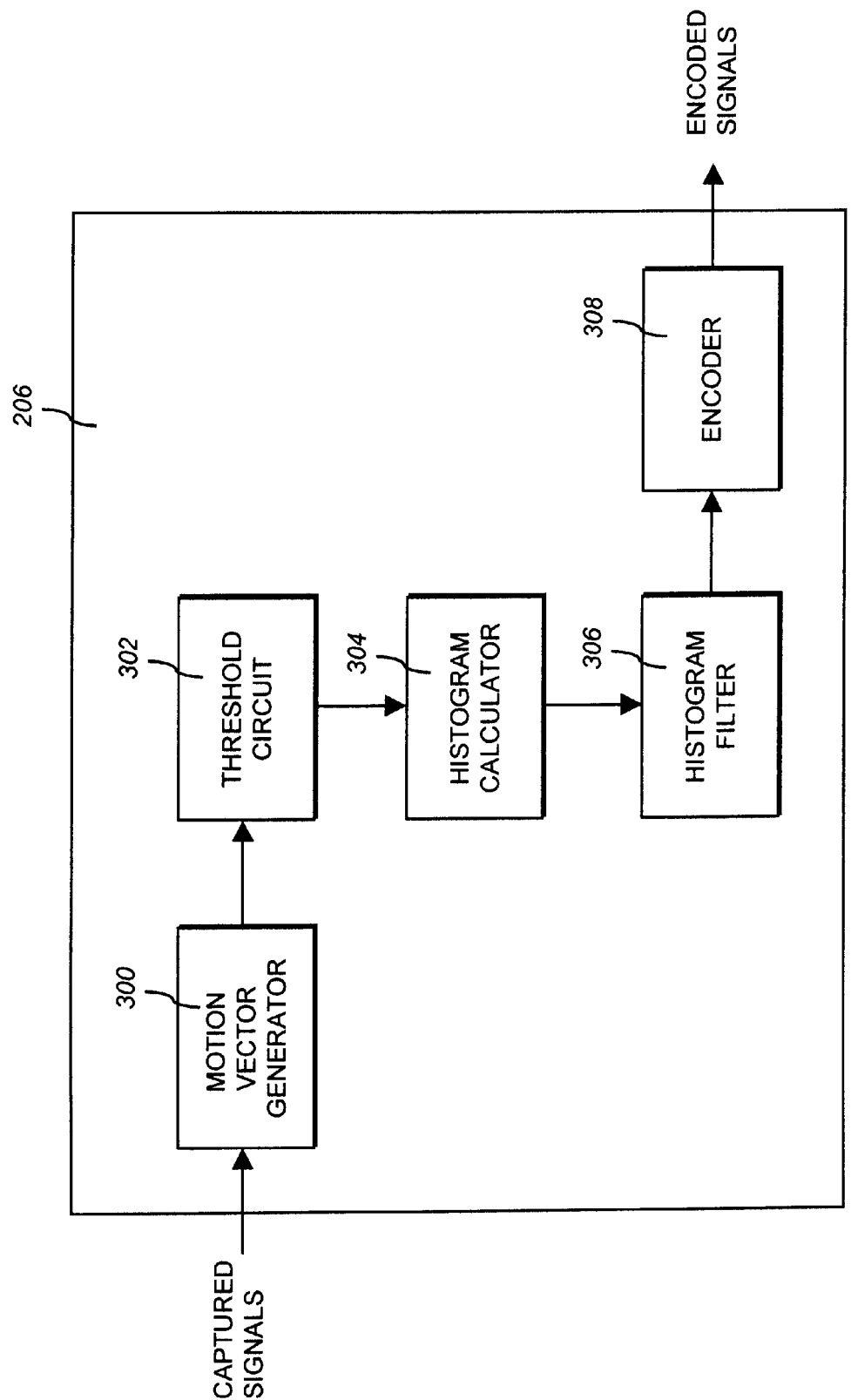
FIG. 3 is a detailed block diagram of a pixel processor for implementing motion vector compression according to the present invention.
Figure 4:
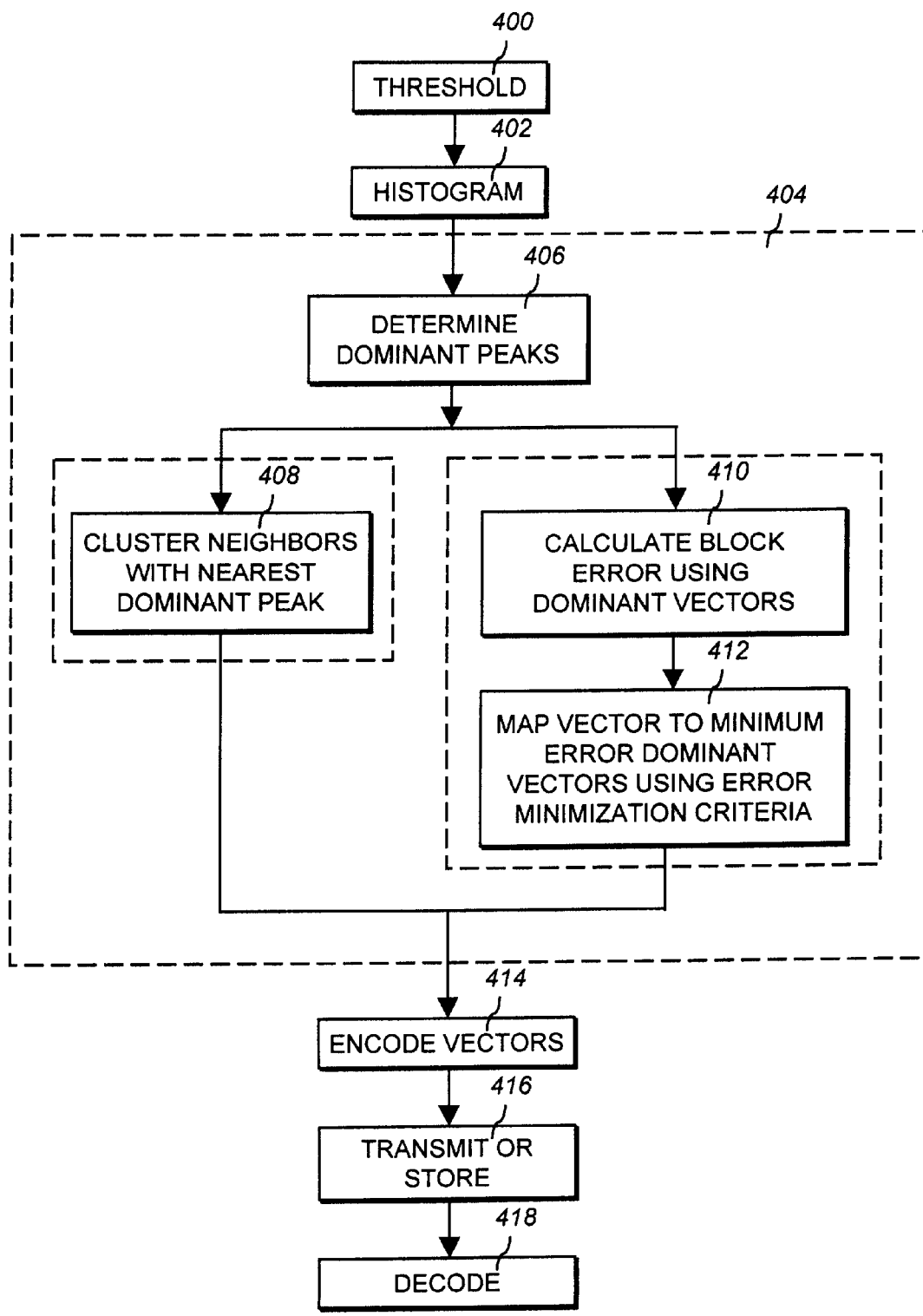
FIG. 4 is a flow chart illustrating the process of motion vector compression according to the present invention.

FIG. 3 is a detailed block diagram of the pixel processor 206 for implementing motion vector compression according to the flow chart of FIG. 4. Those skilled in the art will recognize that the blocks of FIG. 3 are functional blocks that may be implemented in either hardware or software. Given the functional description of the blocks herein, one skilled in the art would be able to implement the present invention using well-known combinational and/or sequential logic, and/or software without undue experimentation. In particular, compression may be implemented in the host processor 216 as hardware or software, rather than in the pixel processor 206.

A motion vector generator 300 provides motion vectors, along with their corresponding correlation errors, to an optional thresholding circuit 302. The motion vectors that survive thresholding, and their corresponding errors, are transferred to a histogram circuit calculator 304. In an alternative embodiment that omits thresholding, the motion vectors from the motion vector generator 300 are transferred directly to the histogram calculator 304. The histogram values are input to a histogram filter circuit 306. Motion vectors corresponding to filtered histogram values generated by the histogram filter 306 are transferred to an encoder 308, which provides the encoded signals shown in FIG. 2.

The motion vector generator 300 may generate motion vectors according to any technique known in the art, or according to the method taught in "Process, Apparatus, and System for Two-Dimensional Caching," U.S. application Ser. No. 08/262,668, filed on Jun. 29, 1994, and assigned to the assignee of the present invention.

The operation of the present invention will be described in detail with reference to FIG. 4. The motion vectors may optionally be thresholded by the thresholding circuit 302 to determine whether a motion vector need be sent for a particular search block (step 400). According to a relative thresholding technique of resent invention, for each F2 search block:

$$\text{If } \frac{\text{Err }(0, 0)}{\text{Err }(v)} < T_R \text{ then set } v = (0, 0) \qquad \text{(Eq. 1)}$$

where
v is the minimum-error motion vector for the F2 search block, i.e., the vector resulting in the minimum error,
Err (v) is the error associated with the motion vector v,
Err (0, 0) is the error associated with the null motion vector (0, 0), i.e., it is assumed that the image in F1 corresponding to the F2 search block does not move from F1 to F2.

By thresholding the motion vectors according to Equation 1, the thresholding circuit effectively eliminates those minimum-error motion vectors that provide no significant improvement over using the (0, 0) motion null vector, which is equivalent to using no motion vector at all. In other words, if using the F1 block found at the same absolute frame coordinates as the F2 block results in no significant degradation in the motion vector error as compared to using the minimum-error motion vector, which by definition causes the minimum error for the block, then the (0, 0) motion vector may as well be used. By mapping minimum-vector motion vectors to the (0, 0) motion vector according to thresholding, the thresholding circuit reduces the number of motion vectors that need to be encoded, thus reducing the bandwidth required to transmit image information. Those skilled in the art will recognize that, in place of Equation 1, a number of thresholding techniques may be employed to eliminate those minimum-error motion vectors that provide no significant improvement over the (0, 0) motion vector. Further, an acceptable threshold $T_R$ may be selected based upon a number of techniques. For example, $T_R$ may be assigned a fixed value, such as 1.1, so that motion vectors will be mapped to the null vector if the null vector causes only a 10% error degradation. Alternatively, the threshold can be adaptively varied based upon empirical evidence correlating threshold size to the quality of the reconstituted image after encoding and decoding.

Although thresholding results in an improvement in the resulting image bandwidth, the present invention preferably processes the motion vectors further. Whether the motion vectors have been thresholded or not, the motion vectors are passed on to the histogram calculator 304 to calculate the frequency of occurrence of each motion vector associated with the frame F2 (step 402). Any well-known histogramming technique may be employed, and such techniques may include preprocessing to smooth the image. Smoothing may be accomplished using methods such as kernel convolution, histogram stretching, or histogram equalization, among others. For further information concerning histograms, please refer to M. Nadler, E. P. Smith, *Pattern Recognition Engineering,* Wiley Interscience 1993.

Figure 5:
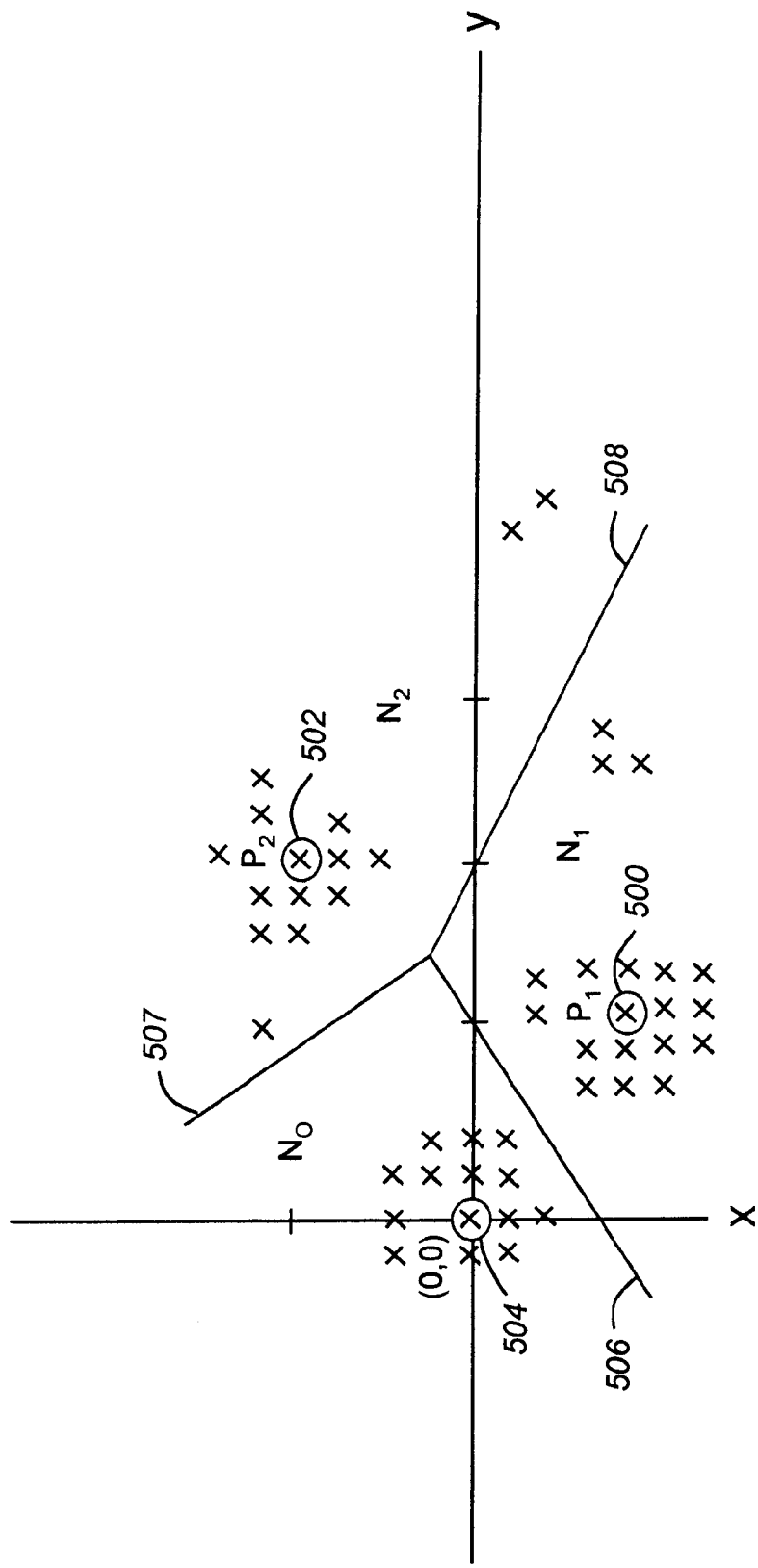
FIG. 5 is a top view of a histogram exemplifying one embodiment of the present invention.

The histogram for each frame is preferably a three-dimensional histogram. A top view of a time sample of histogram values for a frame is shown in FIG. 5. Every motion vector point (x, y) is mapped to a histogram value H (x, y) as indicated by an "x" in the figure. Note that in many applications, such as video conferencing, it can be assumed that the null motion vector (0, 0) would occur frequently in the image, thereby resulting in either a global or a local maximum histogram peak at (0, 0).

After the histogram is calculated, the histogram filter 306 performs the functions diagrammed in step 404. Step 404 comprises sub-step 406, followed either by step 408 or steps 410 and 412, according to alternative embodiments of the present invention. The histogram filter 306 determines the N most dominant peaks, i.e., the N largest histogram peaks representing the most frequently occurring motion vectors (step 406). The number N can take on any value, but preferably is chosen so that after processing in step 404 and encoding in step 414, the resulting compressed motion vectors accommodate the channel capacity of the transmission medium. When determining the dominant peaks, the null motion vector (0, 0) need not be (although it may be) included in the N dominant peaks because the null motion vector effectively represents the absence of a motion vector, i.e., the null vector or a representation thereof need not be transmitted to the decoder because the decoder preferably assumes that any F2 block not associated with a motion vector is merely a duplicate of the corresponding F1 block at the same coordinates.

FIG. 5 illustrates an example in which N=2. The dominant motion vectors $P_1$ at peak 500 and $P_2$ at peak 502, and the null motion vector at peak 504, are circled. Because these peaks represent the most frequently occurring minimum-error motion vectors (the null vector is typically, though not always, one of the most frequently occurring vectors), the present invention uses the dominant motion vectors, and usually the null vector, to represent all minimum-error motion vectors associated with the image. After the dominant peaks are determined, the remaining minimum-error motion vectors in the frame must be mapped either to the dominant motion vectors or the null motion vector. This mapping is preferably performed in the histogram filter 306.

In one embodiment, motion vectors may be assigned to the motion vector of the nearest dominant peak (step 408). As shown in FIG. 5, the histogram (x, y) plane may be divided into three neighborhoods $N_0$, $N_1$ and $N_2$, with $N_0$ corresponding to a neighborhood about the null motion vector peak 504, $N_1$ corresponding to the neighborhood about the most dominant motion vector $P_1$ at 500, and $N_2$ corresponding to the neighborhood around the second most dominant motion vector $P_2$ at 502. This technique assumes that there is some local correlation of motion vectors within the image. It is often a safe assumption that the translation undergone by one group of pixels will be identical to the translation undergone by its nearest neighbor group of pixels. For example, the pixels comprising an image of a ball will typically undergo the same translational motion frame-to-frame.

The boundaries of the neighborhoods may be selected according to an almost unlimited number of methods. In one embodiment, the boundary lines 506, 507 and 508 can be selected as the three intersecting bisectors between the null vector peak 504 and the $P_1$ peak 500, the null vector peak 504 and the $P_2$ peak 502, and the $P_1$ peak 500 and the $P_2$ peak 502, respectively. In other embodiments, the size of the neighborhoods may be weighted so that a more dominant peak is assigned a larger neighborhood than the peaks associated with less frequently occurring dominant motion vectors. The division of the motion vectors into neighborhoods and the mapping of the vectors to the local peak may be performed by the histogram filter using a variety of implementations, including but not limited to hardware or microcode software.

Recall that Err (v) represents the error associated with a minimum-error motion vector for a particular F2 block. By definition, the F1 block associated with the motion vector represents the best match (within the search area) to the F2 block. However, because not every motion vector can be transmitted due to bandwidth constraints, compression is performed according to another embodiment of the present invention by mapping each minimum-error motion vector either to the null vector (preferably through thresholding) or to one of the most dominant vectors according to which of those representative vectors would cause the least image degradation. This process is performed as follows.

For each of the most dominant vectors $P_1, P_2, \ldots, P_N$ associated with each F2 block, the histogram filter 306 calculates the correlation error that would occur if the dominant motion vector were substituted for the minimum-error motion vector (the vector causing the global minimum correlation error) (step 410). That is, for each F2 block calculate $$\text{Err}(P_1), \text{Err}(P_2), \text{Err}(P_N)$$

Of those values, the dominant vector P causing the smallest error is selected. The global minimum-error motion vector v is mapped to this local minimum-error dominant vector $P_{min}$ (step 420). The histogram filter can perform these functions by starting with the first dominant peak, determining the associated error, and comparing the first error to the error corresponding to the next dominant peak.

The minimum of the two errors is the candidate for the local minimum-error dominant vector. This candidate is compared to the error of the next dominant peak, and the process continues for all the remaining dominant vectors so that the true local minimum-error dominant motion vector is finally selected.

Note that, instead of performing thresholding at step 400, the null vector (0, 0) could be included in the minimum error calculation along with the dominant vectors. In either case, the global minimum-error motion vector v for each F2 block is mapped to a "best guess" motion vector that causes the smallest increase in error as compared to the global minimum-error Err (v).

Figure 6:
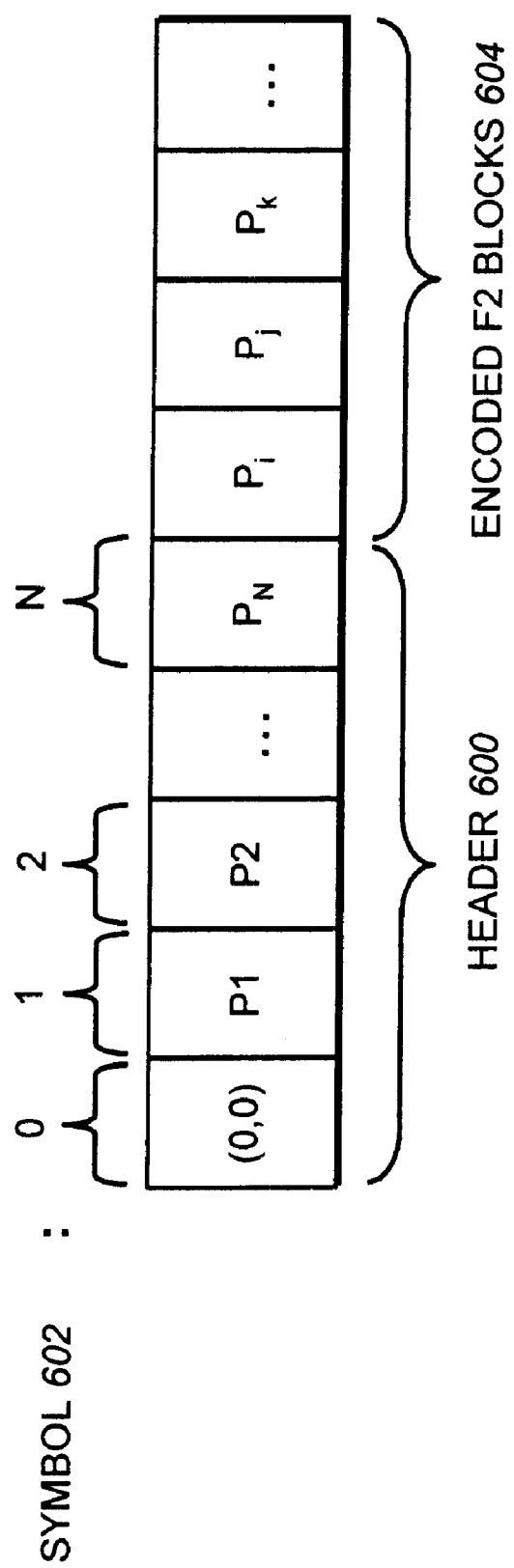
FIG. 6 illustrates an encoded string according to the present invention.

After the motion vectors have been mapped according to any of the above techniques, they are encoded by the encoder 308 into a string to be stored or transmitted across the transmission medium (step 414). The encoder 308 may use a variety of standard techniques, including, but not limited to, run-length encoding, block coding or Huffman coding. FIG. 6 illustrates a simplified encoded string. The string includes a header 600 followed by code symbols representing the mapped motion vector for each F2 block. In this example, symbols for the 8×8 F2 blocks of FIG. 1 are illustrated. Using the ±8 search area of that example, the eight bit representations for the null motion vector (0, 0), and $P_1, P_2, \ldots, P_N$ occupy fields in the header 600. Each one of those vectors is mapped into a symbol 602. For example, the null motion vector may be mapped to a symbol 0, $P_1$ to 1, $P_2$ to 2, . . . , and $P_N$ to N. Subsequent fields 604 in the string are associated with the F2 blocks. Instead of transmitting or storing the global minimum-error motion vector v associated with each block, and instead of transmitting the null or dominant vector to which the minimum-error motion vectors v are mapped, the present invention transmits or stores the encoded symbols for each mapped null or dominant vector corresponding to a minimum-error motion vector (step 416). After transmission, the motion vectors may then be decoded according to any well-known decoding method complementary to the encryption method used in step 414 (step 418). One skilled in the art will recognize that further compression can be achieved by using a more sophisticated encryption method than that shown in FIG. 6. For example, rather than transmitting a symbol for each F2 block, the encoder 308 may instead run-length encode the symbols, use block coding, or any other technique well known in the art.

It will be appreciated that various modifications and alterations might be made by those skilled in the art without departing from the spirit and scope of the present invention. The invention should, therefore, be measured in terms of the claims which follow.

What is claimed is:

1. In a system in which frames are each encoded into a plurality of minimum-error motion vectors, each motion vector has a frequency of occurrence within a frame, wherein each frame is divided into blocks, a method for compressing the minimum-error motion vectors comprising:

(1) creating a histogram of at least two minimum-error motion vectors to generate at least two histogram peaks; and (2) mapping other motion vectors using error-minimization criteria to one of the at least two histogram peaks, the other motion vectors being located in a spatial neighborhood around the one of the at least two histogram peaks, the spatial neighborhood having a boundary determined by a characteristic of the at least two histogram peaks, the characteristic being one of a bisector intersection between the at least two histogram peaks and a weighted dominance such that a more dominant peak in the at least two histogram peaks has a larger size than a less dominant peak in the at least two dominant peaks.

2. The method of claim 1, further comprising:

(3) mapping a minimum-error motion vector to a null motion vector (0,0) if the minimum-error motion vector causes less than a predetermined amount of improvement over the frame-to-frame correlation error associated with the null motion vector.

3. The method of claim 2, wherein mapping the other motion vectors comprises:

mapping a minimum-error motion vector to a dominant motion vector corresponding to the minimum-error motion vector, wherein the frame-to-frame correlation error associated with the corresponding dominant motion vector is less than the frame-to-frame correlation errors associated with all other dominant motion vectors for the block associated with the minimum-error motion vector.

4. The method of claim 1, wherein mapping the other motion vectors comprises:

mapping a minimum-error motion vector to a dominant motion vector corresponding to the minimum-error motion vector, wherein the frame-to-frame correlation error associated with the corresponding dominant motion vector is less than the frame-to-frame correlation errors associated with other dominant motion vectors for the block associated with the minimum-error motion vector.

5. The method of claim 4, further comprising:

associating each of the dominant motion vectors with a symbol; and encoding each minimum-error motion vector into the symbol associated with the dominant motion vector to which the minimum-error motion vector is mapped.

6. The method of claim 5, further comprising:

transmitting the symbol to a receiver.

7. The method of claim 6, further comprising:

receiving the symbols; and decoding the symbols into a two-dimensional frame.

8. The method of claim 5, further comprising:

storing the symbols in a storage medium.

9. The method described in claim 1 wherein said error minimization criteria minimizes the correlation error for that block.

10. The method described in claim 1 wherein said at least two minimum error motion vectors includes a null vector.

11. The method described in claim 10 wherein said at least two minimum error motion vectors include at least two minimum error motion vectors besides the null vector.

12. In a system in which frames are each encoded into a plurality of minimum-error motion vectors, each motion vector has a frequency of occurrence within a frame, wherein each frame is divided into blocks, an apparatus for compressing the minimum-error motion vectors, the apparatus comprising:

a histogram calculator circuit creating a histogram of at least two minimum-error motion vectors to generate at least two histogram peaks; and a histogram filter circuit coupled to said histogram calculator circuit, said histogram filter circuit maps, using error minimization criteria at least one minimum-error motion vector to one of the at least two histogram peaks, the at least one minimum-error motion vector being located in a spatial neighborhood around the at least two histogram peaks, the spatial neighborhood having a boundary determined by a characteristic of the at least two histogram peaks, the characteristic being one of a bisector intersection between the at least two histogram peaks and a weighted dominance such that a more dominant peak in the at least two histogram peaks has a larger size than a less dominant peak in the at least two dominant peaks.

13. The apparatus of claim 12, further comprising a thresholding circuit for mapping a minimum-error motion vector to a null motion vector (0,0) if the minimum-error motion vector causes less than a predetermined amount of improvement over the frame-to-frame correlation error associated with the null motion vector.

14. The apparatus of claim 13 wherein the histogram filter comprises:

comparator circuitry for determining a minimum frame-to-frame correlation error among the dominant motion vectors for a block, wherein a minimum-error dominant motion vector is associated with the minimum frame-to-frame correlation error; and circuitry for mapping a minimum-error motion vector to a corresponding minimum-error dominant motion vector for the block associated with the minimum-error motion vector.

15. The apparatus of claim 12 wherein the histogram filter comprises:

comparator circuitry for determining a minimum frame-to-frame correlation error among dominant motion vectors for a block, wherein a minimum-error dominant motion vector is associated with the minimum frame-to-frame correlation error; and circuitry for mapping a minimum-error motion vector to a corresponding minimum-error dominant motion vector for the block associated with the minimum-error motion vector.

16. The apparatus of claim 12, further comprising:

an encoder for associating each dominant motion vector with a corresponding symbol, and encoding each minimum-error motion vector into the symbol associated with the dominant motion vector to which the minimum-error motion vector is mapped.

17. The apparatus of claim 16, further comprising:

a transmitter for transmitting the symbols to a receiver.

18. The apparatus of claim 17 further comprising:

a receiver for receiving the symbols; and a decoder for decoding the symbols into a two-dimensional frame.

19. The apparatus of claim 16, further comprising:

a storage medium for storing the symbols.

20. In a system in which frames are each encoded into a plurality of minimum-error motion vectors, each motion vector has a frequency of occurrence within a frame, wherein each frame is divided into blocks, an apparatus for compressing the minimum-error motion vectors, the apparatus comprising:

a thresholding circuit that maps a minimum-error motion vector to a null motion vector (0,0) if the minimum-error motion vector causes less than a predetermined amount of improvement over the frame-to-frame correlation error associated with the null motion vector;

a histogram calculator circuit coupled to said thresholding circuit, said histogram calculator circuit creates a histogram with at least one minimum-error motion vector to generate at least one histogram peak, each peak representing the frequency of occurrence of the at least one minimum-error motion vector within a frame, the at least one peak including a plurality of dominant peaks representing the frequency of occurrence of a plurality of dominant motion vectors; and a histogram filter circuit coupled to said histogram filter circuit, said histogram filter circuit maps, using error minimization criteria at least one minimum-error motion vector to one of said plurality of dominant motion vectors, the at least one minimum-error motion vector being located in a spatial neighborhood around the one of the plurality of dominant motion vectors, the spatial neighborhood having a boundary determined by a characteristic of the at least two histogram peaks, the characteristic being one of a bisector intersection between the at least two histogram peaks and a weighted dominance such that a more dominant peak in the at least two histogram peaks has a larger size than a less dominant peak in the at least two dominant peaks.

21. The apparatus of claim 20 wherein the histogram filter comprises:

comparator circuitry that determines a minimum frame-to-frame correlation error for a block, wherein a minimum-error motion vector is associated with the minimum frame-to-frame correlation error; and circuitry that maps the minimum-error motion vector to a minimum-error dominant motion vector.

22. The apparatus of claim 20, further comprising:

an encoder for associating each dominant motion vector with a corresponding symbol, and encoding each minimum-error motion vector into the symbol associated with the dominant motion vector to which the minimum-error motion vector is mapped.

23. The apparatus of claim 22, further comprising:

a transmitter for transmitting the symbols to a receiver.

24. The apparatus of claim 23 further comprising:

a receiver for receiving the symbol; and a decoder for decoding the symbols into a two dimensional frame.

25. The apparatus of claim 22, further comprising:

a storage medium for storing the symbols.

26. In a system in which frames are each encoded into a plurality of minimum-error motion vectors, each motion vector has a frequency of occurrence within a frame, wherein each frame is divided into blocks, a method for compressing the minimum-error motion vectors comprising the steps of:

(1) choosing a number of motion vectors to transmit depending on the bandwidth of a transmission medium;

(2) histogramming said number of minimum-error motion vectors to generate a number of histogram peaks corresponding to said number of minimum-error motion vectors;

(3) using error minimization criteria to map at least one of the plurality of minimum-error motion vectors to at least one of said number of histogram peaks, the at least one of the plurality of minimum-error motion vectors being located in a spatial neighborhood around the at least one of said number of histogram peaks, the spatial neighborhood having a boundary determined by a characteristic of the at least two histogram peaks, the characteristic being one of a bisector intersection between the at least two histogram peaks and a weighted dominance such that a more dominant peak in the at least two histogram peaks has a larger size than a less dominant peak in the at least two dominant peaks; and (4) transmitting said number of minimum-error motion vectors through a transmission medium.

27. The method of claim 26, wherein said transmitting medium is a telephone line.

28. The method of claim 26, wherein said transmitting medium is a radio frequency broadcast signal.

* * * * *

UNITED STATES PATENT AND TRADEMARK OFFICE
CERTIFICATE OF CORRECTION

PATENT NO. : 6,178,265 B1
DATED : January 23, 2001
INVENTOR(S) : Haghighi

Page 1 of 1

It is certified that error appears in the above-identified patent and that said Letters Patent is hereby corrected as shown below:

<u>Column 6,</u>
Line 28, delete "resent" and insert -- present --.

Signed and Sealed this

Twenty-sixth Day of March, 2002

Attest:

JAMES E. ROGAN
*Attesting Officer*  *Director of the United States Patent and Trademark Office*